United States Patent [19]

Vaughan et al.

[11] 4,178,352

[45] Dec. 11, 1979

[54] SYNTHESIS OF TYPE Y ZEOLITE

[75] Inventors: David E. W. Vaughan, Columbia; Grant C. Edwards, Silver Spring; Michael G. Barrett, Laurel, all of Md.

[73] Assignee: W. R. Grace & Co., New York, N.Y.

[21] Appl. No.: 944,557

[22] Filed: Sep. 21, 1978

Related U.S. Application Data

[63] Continuation-in-part of Ser. No. 879,266, Feb. 21, 1978, abandoned, and a continuation-in-part of Ser. No. 880,194, Feb. 22, 1978, abandoned, which is a continuation-in-part of Ser. No. 822,310, Aug. 5, 1977, abandoned, which is a continuation of Ser. No. 742,943, Nov. 18, 1976, abandoned, which is a continuation of Ser. No. 653,695, Jan. 30, 1976, abandoned.

[51] Int. Cl.² ............................................. C01B 33/28
[52] U.S. Cl. .................................... 423/329; 423/330
[58] Field of Search ................................ 423/328–330, 423/118; 252/455 Z

[56] References Cited

U.S. PATENT DOCUMENTS

| 3,433,589 | 3/1969 | Ciric | 423/329 |
| 3,574,538 | 4/1971 | McDaniel et al. | 423/329 |
| 3,639,099 | 2/1972 | Elliott et al. | 423/330 |
| 3,671,191 | 6/1972 | Maher et al. | 423/329 |
| 3,789,107 | 1/1974 | Elliott | 423/329 |
| 3,808,326 | 4/1974 | McDaniel et al. | 423/329 |

*Primary Examiner*—Edward J. Meros
*Attorney, Agent, or Firm*—Arthur P. Savage

[57] ABSTRACT

Type Y zeolite is prepared using a minimum excess of reactants by a method wherein required sodium hydroxide, silica, alumina and water reactants are combined in multi-stage procedure to obtain a uniform fluid reaction slurry. The procedure permits the efficient commercial production of high quality type Y zeolite and minimizes the formation of excess silicate containing by-product effluent.

5 Claims, No Drawings

SYNTHESIS OF TYPE Y ZEOLITE

This application is a continuation-in-part of our U.S. Ser. No.'s 879,266 filed Feb. 21, 1978, now abandoned, and 880,194 filed Feb. 22, 1978, now abandoned, which are continuations-in-part of U.S. Ser. No. 822,310 filed Aug. 5, 1977, now abandoned, which is a continuation of U.S. Ser. No. 742,943 filed Nov. 18, 1976, now abandoned, which in turn is a continuation of U.S. Ser. No. 653,695 filed Jan. 30, 1976, now abandoned.

The present invention relates to the preparation of type Y zeolite, and more specifically to an efficient process for preparing commercial quantities of type Y zeolite wherein use of excess soda ($Na_2O$) and silica ($SiO_2$) is minimized.

The prior art discloses various methods for preparing a type Y zeolite wherein sources of silica, alumina, sodium hydroxide and water are combined with finely divided alumino-silicate nucleation centers. In typical prior art zeolite preparation processes the reaction mixtures are reacted at a temperature of about 100° C. to obtain type Y zeolite in yields which are substantially stochiometric with respect to the alumina reactant. However, to date, most practical prior art methods for preparing type Y zeolite require the use of excess sodium hydroxide and silicate, particularly where commercial quantities of high purity type Y zeolite are obtained which have relatively high silica to alumina ratio, i.e. a $SiO_2/Al_2O_3$ in excess of about 4.5.

U.S. Pat. No. 3,639,099 to Elliott et al discloses a method for preparing type Y zeolite wherein the quantity of excess sodium hydroxide required to produce type Y zeolite is reduced by using aluminum sulfate in lieu of sodium aluminate as a source of alumina.

U.S. Pat. No. 3,433,589 to Ciric et al describes a two-stage procedure for producing type Y zeolite in which an initial silica-alumina hydrogel reaction mixture is combined with additional reactants such as sodium hydroxide to form a zeolite producing reaction mixture.

U.S. Pat. Nos. 3,574,538 and 3,808,326 to McDaniel, U.S. Pat. No. 3,671,191 to Maher et al and U.S. Pat. No. 3,789,107 to Elliott disclose methods for preparing zeolites wherein zeolite nucleation centers are combined and reacted with sources of silica, alumina, sodium hydroxide and water.

It is therefore an object of the present invention to provide a method by which type Y zeolite may be prepared using a minimum excess of reactants, thereby minimizing pollution problems, and reducing the need for effluent purification facilities.

It is another object to provide a commercially feasible type Y synthesis process in which use of excess quantities of soda ($Na_2O$) and silica ($SiO_2$) are avoided.

It is yet another object to provide a commercial process for producing type Y zeolite which utilizes inexpensive raw material sources of alumina, silica and soda.

These and still further objects of the present invention will become obvious to one skilled in the art from the following detailed description and specific examples.

Broadly, our invention contemplates a type Y zeolite preparation method in which sodium silicate, water, zeolite-forming alumina silicate seeds, sodium aluminate and an inorganic acid, preferably sulfuric acid, are combined under conditions of agitation and heating, and reacted to form nearly stoichiometric yields ($SiO_2$ basis) of zeolite.

More specifically, we have found type Y zeolite may be rapidly and economically prepared by the following procedure:

(1) Preparing a slurry of zeolitic nucleation centers having an average particle size below about 0.1 micron and the following mol ratio composition:

12 to 19 $Na_2O$; 0.7 to 9 $Al_2O_3$; 12 to 19 $SiO_2$; 220 to 900 $H_2O$ (2) Preparing an intermediate reaction mixture by combining at least a part of the nucleation center slurry of step (1) with sources of $Na_2O$, $Al_2O_3$, $SiO_2$ and $H_2O$ to obtain a reaction mixture having the following ratios of reactants:

2 to 6 $Na_2O$; 4.5 to 11 $SiO_2$; $Al_2O_3$; 30 to 200 $H_2O$ (3) The intermediate ion reaction mixture is agitated and heated to a temperature of about 30° to 80° C. for a period of preferably about 2 hours.

(4) A final reaction mixture having the reactant ratio 0.5 to 2.5 $Na_n(A)$; 1.2 to 3 $Na_2O$; 4 to 7.5 $SiO_2$; $Al_2O_3$: 40 to 200 $H_2O$, wherein A is an anion such as $SO_4^{--}$, $NO_3^-$ or $Cl^-$ and n is the valence of A, is prepared by adding an aluminum salt and/or inorganic acid to the intermediate reaction mixture.

(5) The final reaction mixture is agitated and heated to a temperature of about 80° to 150° C. for a period of 2 to 40 hours to obtain sodium type Y zeolite.

In the preferred practice of our invention, sodium silicate solution is utilized which comprises a solution of sodium silicate having a $Na_2O:SiO_2$ ratio of about 0.30 to 0.34 dissolved in water in amounts which range from about 34 to 40 weight percent solids. Sodium silicate having other $Na_2O/SiO_2$ ratios can be used but the above ratio is preferred. An aluminum sulfate solution may be used as a source of $Al_2O_3$ and sulfate wherein aluminum sulfate hydrate having the composition $Al_2(SO_4)_3.13$—18 $H_2O$ is dissolved in water to produce a solution containing about 4 to 9 percent by weight $Al_2O_3$. Another source of $Na_2O$ and $Al_2O_3$ is sodium aluminate solution which comprises from about 15 to 40 weight percent sodium aluminate, having a composition 1.2 to 1.8 $Na_2O:Al_2O_3$ dissolved in water. These reactant compositions are optimum in the sense that they are available or readily made in a commercial plant.

In the event sodium aluminate solution is utilized to provide all the alumina present in the final reaction mixture, a mineral acid such as sulfuric acid, hydrochloric acid or nitric acid solution may be added to provide the desired effective free soda and water level in the final reaction mixture indicated above. It is to be noted that the effective soda level is that quantity of soda which is not neutralized by the presence of inorganic acid anion. In the reaction mixtures indicated above, the quantity of sodium salt, i.e. $Na_2SO_4$, NaCl or $NaNO_3$ is to be considered inactive in so far as the zeolite synthesis is concerned. In other words, the sodium ion indicated as an acid sodium salt is not used to calculate the critical soda to silicate and soda to alumina ratios required to produce type Y zeolite.

The zeolite forming alumina silicate seeds, sometimes referred to as zeolite nucleation centers, comprise a reaction mixture of soda, silica, alumina and water in the amounts indicated above. To prepare the slurry of zeolite nucleation centers, appropriate amounts of sodium silicate, sodium aluminate and water are combined and aged for a period of about 1 to 500 hours at a temperature of 0° C. to 90° C. (shorter time at higher temperature).

Preparation of suitable zeolite-forming alumina silicate seeds or nucleation centers is typically disclosed in U.S. Pat. Nos. 3,639,099 to Elliott et al, and 3,808,326 to McDaniel et al. In addition to the use of zeolite forming alumina silicate seeds disclosed in the prior art, it is also contemplated that seeds having a particularly high alumina content such as disclosed in our copending U.S. application Ser. No. 880,194 filed Feb. 22, 1978 be advantageously used in the practice of the method disclosed herein.

The intermediate reaction mixture is preferably prepared under conditions of vigorous agitation and heating to a temperature of about 30° to 80° C. by addition of the reactants in the following order: sodium silicate, water, zeolite nucleation centers and sodium aluminate solutions. The aluminum sulfate and/or sulfuric acid solution is then added to the homogenized initial mixture to form the final zeolite forming reaction mixture. The quantity of zeolite nucleation centers used to prepare the intermediate reaction mixture may range from the amount required to provide from about 0.1 to 20 mol percent of the $Al_2O_3$ present in the intermediate mixture.

Subsequent to forming the intermediate reaction mixture which is maintained under conditions of agitation and heating, the reaction mixture ratios are adjusted as indicated in step 4 above, by addition of an acid aluminum salt and/or mineral acid. The effect of the addition of the acid is to increase the alumina content to the level required to produce type Y zeolite while at the same time reducing the effective soda concentration by neutralization with added acid ion. In the event the initial reaction mixture prepared in step 1 contains sufficient alumina by use of sodium aluminate, the effective soda concentration is adjusted through the addition of mineral acid. Or a mixture of aluminum salt, preferably alumina sulfate, and acid, preferably sulfuric acid, may be used to both adjust the alumina concentration and the effective soda level required for type Y zeolite synthesis. Selection of the reactants will depend upon availability and plant facilities.

If the reaction mixture is not vigorously homogenized during the acid addition step, the reaction mixture will gel, which results in a non-homogeneous mix, and the formation of impurities and/or poor product yields. Injection of steam into the reaction mixture is a preferred method for obtaining and maintaining a homogeneous reaction mixture.

The present type Y zeolite preparation method produces yields of zeolite which are closer to stoichimetric with respect to silicate than processes heretofore disclosed. Typically, our process results in the formation of excess silicate ($SiO_2$) which ranges from less than 3 mols and preferably less than 1½ mols of $SiO_2$ per mol of zeolite produced, i.e.: Mols $SiO_2$ (reaction slurry)—Mols $SiO_2$ (zeolite product)=Mols $SiO_2$ (excess infiltrate)=less than 1½ to 3. In some instances it is found that the production of excess silicate may be reduced to nearly zero.

The type Y zeolite prepared by the method disclosed herein will possess a silica to alumina ratio of from about 4 to 5.5 having a crystallinity of in excess of 95% as measured by standard X-ray crystallographic procedures. Type Y zeolite may be utilized in the preparation of a variety of adsorbent and/or catalytic compositions. In particular, it is found that the sodium type Y zeolite obtained by our process may be readily exchanged with polyvalent metal ions and/or hydrogen ions to obtain exchanged zeolites which are highly active for the catalytic cracking of hydrocarbons.

Having described the basic aspects of our invention, the following examples are given to illustrate specific embodiments thereof:

EXAMPLE 1

This example illustrates a method of preparing the nucleation centers and the steps necessary for using these steps to initiate reaction. A sodium aluminate solution was prepared by dissolving 104 g. of alumina trihydrate ($Al_2O_3.3H_2O$) in a boiling solution of 153 g. of sodium hydroxide in 300 ml. of water. The solution was cooled to room temperature and added with rapid stirring to a mixture of 521 g. of sodium silicate (41° Be'; $Na_2O:3.22\ SiO_2$) in 291 ml. of water. The product set to a stiff gel within 2 min. after mixing was completed. The nucleation centers had the following oxide ratios: $16Na_2O:4Al_2O_3:15SiO_2:320H_2O$. These nucleation centers were prepared for use by diluting 500 g. of the nucleation centers with 352 g. of water to form a pourable slurry having the oxide ratio of $16Na_2O:4Al_2O_3:15SiO_2:640H_2O$, after aging for two days.

EXAMPLE 2

This example illustrates a method of preparing a zeolite from a reaction slurry having the following ratios of reactants: $1.9Na_2O:Al_2O_3:6SiO_2:100H_2O$.

A reaction mixture was prepared by mixing 155 g. of the nucleation centers described above (but with the ratio 16:1.2:15:320) with 438 g of a 41° Be' sodium silicate, having a silica $SiO_2$ to $Na_2O$ ratio of 3.25, and 100 g. of sodium aluminate solution containing 17.9 weight percent $Na_2O$ and 22 weight percent alumina. 132.5 g. of water was added to the mixture. The mixture was stirred vigorously and 193.3 g. of an alum solution [$Al_2(SO_4)_3$] containing 8.3 weight percent of alumina was added to the mixture. The mixture was then heated at a temperature of 100° C. After 9 hours the product was filtered, washed and evaluated. The analysis of the product was as follows:

| | |
|---|---|
| $Na_2O$ | 12.8% |
| $SiO_2$ | 63.9% |
| $Al_2O_3$ | 23.3% |

The silica alumina ratio of the product was 4.65. The product had a surface area of 840 $m^2/g$ indicating a highly crystalline zeolite, and the X-ray diffraction analysis showed an excellent pattern characteristic of zeolite Y.

EXAMPLE 3

This example illustrates the method of preparing a zeolite from a reactant mixture having the following ratio of reactants: $1.8Na_2O:Al_2O_3:6SiO_2:100H_2O$.

In this preparation, 155 g. of the nucleation centers prepared in accordance with the process described in Example 1 (but having the ratio 16:1.2:15:320) diluted with 124 g. water were blended into 437 g. of a 41° Be' sodium silicate having a silica to $Na_2O$ ratio of 3.25. A sodium aluminate (96 g.) solution containing 17.9% $Na_2O$ and 22 weight percent $Al_2O_3$ were added slowly followed by the addition of 205 g. of an alum solution containing 28.06 weight percent $Al_2(SO_4)$. After thorough mixing the slurry was aged for 16 hours at 100° C.

The product was cooled, filtered, washed and analyzed. The analysis of the product was as follows:

| | |
|---|---|
| Na$_2$O | 12.6% |
| Al$_2$O$_3$ | 22.2% |
| SiO$_2$ | 64.9% |

The product had a silica to alumina ratio of 4.96 and a nitrogen surface area of 820 m$^2$/g. The product had an X-ray diffraction pattern characteristic of a Y-type zeolite of high purity.

EXAMPLE 4

This example illustrates the method of preparing a faujasite from a slurry having a composition of 1.6 Na$_2$O:Al$_2$O$_3$:5.6SiO$_2$:100H$_2$O.

A slurry of nucleation centers was prepared using the general process of Example 1 to have a composition of 16Na$_2$O:2Al$_2$O$_3$:15SiO$_2$:500H$_2$O. The nucleation centers (139 g.) were mixed with 544 g. of 41° Be' sodium silicate having a silica to sodium oxide ratio of 3.25 and 132 g. of sodium aluminate containing 18% Na$_2$O and 22% alumina. A total of 190 g. of water was added. An aluminum sulfate solution was prepared to contain 8.0 wt.% Al$_2$O$_3$ and 240 g. of the solution was rapidly blended into the slurry. The mixture was homogenized for a period of 15 minutes. The slurry was heated at 100° C. for 6 hours, filtered, washed and analyzed. The product recovered was a high purity faujasitic zeolite having a silica to alumina ratio of 4.2 and a nitrogen surface area of 840 m$^2$/g.

EXAMPLE 5

This example illustrates the scale up of the process to a pilot plant.

A slurry of nucleation centers was prepared to contain 16Na$_2$O:1.2Al$_2$O$_3$:15SiO$_2$:320H$_2$O. This slurry (6.8 lbs) was blended with 18.9 lbs of 41° Be' sodium silicate solution having an SiO$_2$ to Na$_2$O ratio of 3.22. This slurry along with 0.6 gallon of water was added to a 6 gallon steam jacketed kettle equipped with a mixer. The mixture was blended and 4.6 lbs of sodium aluminate solution containing 18.4% Na$_2$O and 19.9% Al$_2$O$_3$ was added with rapid mixing. After completion of the aluminate addition, the slurry was heated to a temperature of 50° C. at which time 8.9 lbs of aluminum sulfate solution containing 8.37% alumina was added with rapid mixing. The ratio of reactants of the slurry was 1.9 Na$_2$O:1Al$_2$O$_3$:6SiO$_2$:100H$_2$O. The slurry was heated to boiling, and the mixer was turned off 15 minutes after the slurry boiled. After 13 hours of reaction at boiling temperature the product was recovered. The product had the following chemical composition:

| | |
|---|---|
| Al$_2$O$_3$ | 23.4% |
| SiO$_2$ | 63.7% |
| Na$_2$O | 13.3% |

The product had a SiO$_2$ to Al$_2$O$_3$ molar ratio of 4.62, a surface area of 772 m$^2$/g and an X-ray pattern characteristic of zeolite Y.

EXAMPLE 6

This illustrates the use of a slurry of the mol oxide ratio 2.0Na$_2$O:1Al$_2$O$_3$:7SiO$_2$:110H$_2$O to synthesize an NaY zeolite. The synthesis slurry was composed of 310 g. nucleation centers (prepared as in Example 5), 1042 g. 41° Be' sodium silicate solution (Na$_2$O:3.22SiO$_2$ weight ratio), 186 g. sodium aluminate solution (18.5% Na$_2$O; 21.0% Al$_2$O$_3$), 450 g. aluminum sulfate solution (8.4% Al$_2$O$_3$), and 272 g. water. the chemicals were thoroughly mixed with the aluminum sulfate solution added last, and heated to 100°±3° C. for 12 hours. The product was a well crystallized NaY faujasite having a nitrogen surface area of 843 m$^2$/g and a unit cell size of 24.65, which corresponds to a SiO$_2$/Al$_2$O$_3$ ratio of 5.1 on the scale established by D. W. Breck and E. M. Flanigen (*Molecular Sieves*, Society of the Chemical Industry, 1968, pages 47–60).

EXAMPLE 7

The more complete utilization of reactant chemicals and the lower effluent produced in our process over that taught by Elliott et al (U.S. Pat. No. 3,639,099) is illustrated as follows. In order to synthesize 464 g. (one mol) NaY faujasite (mol ratio Na$_2$O:Al$_2$O$_3$:5SiO$_2$) from a synthesis slurry using the slurry oxide ratio of 3.0 Na$_2$O:1.0Al$_2$O$_3$:9SiO$_2$:130H$_2$O (as taught by 3,639,099) effluent contains the following amounts of Na$_2$O and SiO$_2$.

| | Mol Oxides in Slurry | | | |
|---|---|---|---|---|
| | Na$_2$O | Al$_2$O$_3$ | SiO$_2$ | H$_2$O |
| Synthesis Slurry | 3.0 | 1.0 | 9.0 | 130 |
| less NaY product | 1.0 | 1.0 | 5.0 | |
| Effluent Oxides | 2.0 | — | 4.0 | |

Thus 2 mols of Na$_2$O (124 g. Na$_2$O as free alkali) and 4 mols of SiO$_2$ (240 g.) appear in the effluent in order to synthesize 464 g. (one mol) of NaY.

In our improved process the effluent is greatly reduced in the production as one mol of NaY as shown below (data based on Example 5).

| | Mol Oxides In Slurry | | | |
|---|---|---|---|---|
| | Na$_2$O | Al$_2$O$_3$ | SiO$_2$ | H$_2$O |
| | 1.8 | 1.0 | 6.0 | 100 |
| less NaY Product | 1.0 | 1.0 | 5.0 | |
| Effluent Oxides | 0.8 | — | 1.0 | |

Thus, only 0.8 mol Na$_2$O (50 g. Na$_2$O as free alkali) and 1 mol SiO$_2$ (60 g.) appear in the effluent in order to synthesize one mol (464 g.) of NaY. As the excess silica must be precipitated and the soda neutralized with acid before being discharged as an effluent, our process is more efficient in utilization of chemicals and in reduction of effluent from the process of synthesis of the Y type faujasite zeolite than earlier processes.

EXAMPLE 8

The following example illustrates the sulfuric acid neutralization procedure for synthesizing good quality NaY faujasite.

A sodium aluminate solution was prepared by dissolving 118 g. alumina trihydrate in a solution of 84 g. sodium hydroxide and 160 ml. water. After the alumina dissolved, 160 ml. more water was added.

875 g 41.2° Be' sodium silicate was put into a blender. Then 310 g. seeds (16Na$_2$O:1.2Al$_2$O$_3$:15SiO$_2$:320H$_2$O mol oxide ratio) were blended into the silicate. Next the sodium aluminate solution was blended into the mixture of silicate and seeds. The resulting slurry was then transferred to the bowl of a mixer. The mixer was turned on and a solution of 146 g. concentrated sulfuric acid (96%) diluted with 260 ml. water was slowly added with rapid mixing so as to produce a thick homogeneous slurry, having the effective oxide ratio of 1.9:$Na_2O$:1.0$Al_2O_3$:6.0$SiO_2$:100$H_2O$. The slurry was transferred to a two liter resin kettle heated by a heating mantle and heated to 100±2° C. with rapid stirring. After the slurry reached temperature, the stirrer was turned off.

The product after 12 hours at 100±2° C. was an excellent quality NaY faujasite having the following properties:

| % Crystallinity | 96% |
| Surface Area | 800m²/g |
| $SiO_2$/$Al_2O_3$ Ratio | 4.5 |

EXAMPLE 9

This example demonstrates that the order of addition of the seeds and aluminum sulfate solution to the slurry is important. Using the general processing method of the prior art as disclosed in U.S. Pat. No. 3,639,099 wherein seeds are added lastly (after addition of aluminum sulfate solution) and the slurry reaction ratios of the present invention, product crystallinities are low and impurity levels are high. The following experiment was run using the procedure of Example 5, U.S. Pat. No. 3,639,099. The poor crystallization of NaY from such a slurry is illustrated below.

A sodium aluminate solution was prepared by dissolving 41 g $Al_2O_3$.3$H_2O$ in a solution of 30 g sodium hydroxide in 60 ml water; after the $Al_2O_3$.3$H_2O$ dissolved, 30 ml more water was added. The aluminate solution was blended with 591 g sodium silicate solution (26.3% $SiO_2$; 8.2% $Na_2O$) and then a solution of 149 g aluminum sulfate hydrate—$Al_2(SO_4)_3$.18$H_2O$—in 200 ml. water was mixed into the blend of aluminate and silicate. Almost immediately an extremely thick and grainy gel formed. Lastly, 147 ml of seeds (16$Na_2O$:-1$Al_2O_3$:15$SiO_2$:320$H_2O$ slurry ratio) were blended into the gel, but a smooth homogeneous mixture could not be obtained. Instead a non-homogeneous slurry mixture of seeds and gel lumps persisted. This slurry mixture was heated with vigorous mixing to 100±1° C. The slurry ratio was 1.8$Na_2O$:1.0$Al_2O_3$:6.0$SiO_2$:100$H_2O$.

The slurry mixture was held at 100±1° C. and sampled after 12, 16 and 20 hours with the following results:

TABLE

| Hours At 100 ± 1° C. | Product Surface Area, m²/g | % Crystallinity of NaY in Product | Level of Garronite (P,B) Impurity |
|---|---|---|---|
| 12 | <10 | 0 | 0 |
| 16 | 456 | 45 | moderate |
| 20 | 465 | 52 | high |

Thus the slurry obtained by mixing the seeds last into a mixture of silicate, aluminate and aluminum sulfate does not yield a high purity NaY, while a slurry of the same final slurry ratio, as shown in previous examples, yields a high purity NaY when the alum is added last (e.g. Example 3).

The above examples clearly illustrate that type Y zeolite may be quickly and efficiently prepared by the method disclosed herein.

We claim:

1. A process for preparing type Y zeolite comprising:
   (a) preparing a slurry of zeolitic nucleation centers having an average particle size below about 0.1 micron, said slurry having the following mol ratio composition: 12 to 19 $Na_2O$; 0.7 to 9 $Al_2O_3$; 12 to 19 $SiO_2$; 220 to 900 $H_2O$;
   (b) preparing an intermediate reaction mixture by combining the nucleation center composition of step (a) with additional sources of $Na_2O$, $Al_2O_3$, $SiO_2$ and $H_2O$ to obtain a mixture having the following mol ratio composition: 2 to 6 $Na_2O$; 4.5 to 11 $SiO_2$; $Al_2O_3$; 30 to 200 $H_2O$;
   (c) agitating and heating said intermediate reaction mixture of step (b) at a temperature of from about 30° to 80° C.;
   (d) mixing an acid compound selected from the group comprising mineral acids, aluminum salts of mineral acids and mixtures thereof to the reaction mixture of step (c) to obtain a final reaction mixture having the following mol ratio composition: 0.5 to 2.5 $Na_n(A)$; 1.2 to 3 $Na_2O$; 4 to 7.5 $SiO_2$; $Al_2O_3$; 40 to 200 $H_2O$; wherein A is a mineral acid anion and n is the valence of A; and
   (e) heating the final reaction mixture of step (d) to a temperature of from about 80° to 150° C. for from about 2 to 40 hours to obtain type Y zeolite.

2. The process of claim 1 wherein the intermediate reaction mixture of step (b) is obtained by combining the nucleation center composition of step (a) with sodium silicate, sodium aluminate, sodium hydroxide, water and mixtures thereof.

3. The process of claim 1 wherein said mineral acids are selected from the group comprising sulfuric, nitric, hydrochloric acids and mixtures thereof.

4. The process of claim 1 wherein the mols of $SiO_2$ in the reaction mixture resulting from step (e) less the number of mols of $SiO_2$ in said type Y zeolite range from about 0 to 3.

5. The process of claim 4 wherein said mols of $SiO_2$ in the reaction mixture range from about 0 to 1½.

* * * * *